Feb. 3, 1970      L. J. WINDECKER      3,493,460
FIRE RETARDANT LAMINATE
Filed Nov. 21, 1966
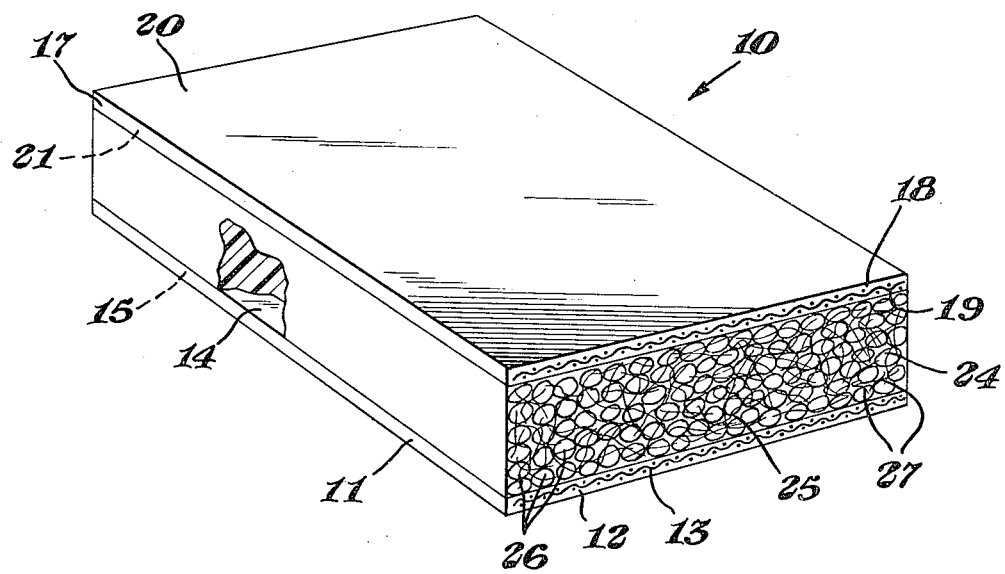
INVENTOR.
Leo J. Windecker
BY
AGENT United States Patent Office 3,493,460
Patented Feb. 3, 1970

3,493,460
FIRE RETARDANT LAMINATE
Leo J. Windecker, Midland, Tex., assignor to The Dow Chemical Company, Midland, Mich., a corporation of Delaware
Filed Nov. 21, 1966, Ser. No. 595,679
Int. Cl. B32b 5/24; C09k 3/28
U.S. Cl. 161—93                    12 Claims

ABSTRACT OF THE DISCLOSURE

A fire retardant laminate including cellular resinous particles in a fire retardant resinous matrix reinforced with filamentary material forming a core sandwiched between a pair of fire retardant resinous skin layers. At least one of the resinous skin layers may have a metallic foil adhered thereto and the cellular particles may also be fire retardant.

---

This invention relates to a fire retardant structure, and more particularly relates to a fire retardant laminar structure of a non-metallic nature.

For various applications, a high strength structure or panel is required which is of a fire resistant nature. Generally, such structures are prepared of composites of metallic and non-metallic elements arranged in a layered manner to prevent the transmission of heat from one major face of the panel to the opposed major face of the panel. Oftentimes, it is desirable to provide a fire resistant panel or structure that has substantial heat insulating value, significant mechanical strength, is fire retardant or resistant and is non-metallic.

It would also be desirable if such a panel were prepared from readily available materials.

It would also be desirable if there were available a high strength fire retardant panel which was easily fabricated to provide a wide variety of sizes.

It would also be desirable if such a fire retardant panel were available having a relatively low weight.

These benefits and other advantages in accordance with the present invention are achieved in a structure, the structure comprising a first high strength non-metallic skin, a second high strength non-metallic skin, the high strength non-metallic skins comprising fire retardant thermoset synthetic resins and a core between the skins, the core comprising a plurality of cellular synthetic resinous particles adhered together by a thermoset fire retardant synthetic resin matrix and having a plurality of high tensile strength filamentary inorganic reinforcing filaments contained partially within the resin matrix and with portions of the filamentary reinforcing material adhered to each of the skins.

Further features and advantages of the present invention will become more apparent from the following specification when taken in connection with the drawing wherein:

The figure schematically depicts a structure in accordance with the invention.

In the figure there is shown a structure in accordance with the invention generally designated by the reference numeral 10. The structure 10 comprises a first facing sheet or skin 11. The first facing sheet or skin 11 comprises a self-extinguishing or fire retardant thermoset synthetic resinous matrix 12 having contained therein an inorganic filamentary reinforcing 13. The first skin 11 has an inner face 14 and an outer face 15. A second skin 17 is oppositely disposed from the first face 11. The skin 17 comprises a fire retardant thermoset synthetic resinous matrix 18 having contained therein a filamentary reinforcing 19. The skin 17 has an outer face 20 and an inner face 21. The faces or skins 11 and 17 are high strength elements. A core 24 is disposed between the faces 21 and 14 of the elements 17 and 11, respectively. The core 24 is adhered to the faces 14 and 21 by means of a fire retardant thermoset resin. The core comprises a core matrix 25 of a thermoset fire retardant synthetic resin. Within the matrix 25 are disposed a plurality of expanded cellular synthetic resinous beads 26. A plurality of inorganic non-metallic high strength filamentary reinforcing elements 27 are disposed at least partially within the matrix 25 and are adhered to the faces 14 and 21 of the skins 15 and 17, respectively, by means of a thermoset synthetic resinous fire retardant material. A metallic foil is adhered to the surface 20 of the sheet 17.

Beneficially, structures in accordance with the present invention such as the panel 10 are readily fabricated from a wide variety of materials. Beneficially, the filamentary reinforcing employed in the skin is a mass of inorganic high strength filamentary reinforcing elements such as a glass cloth, glass mat or a plurality of layers of glass roving encapsulated within a fire retardant thermoset synthetic resinous matrix. Beneficially, reinforced sheets such as the high strength skins 11 and 17 are well known in the art. The core such as the core 24 is prepared by admixing a mass of expanded synthetic resinous particles with at least a binding quantity of a self-extinguishing fire retardant thermosetting resin together with a desired quantity of filamentary reinforcing agents, mixing the filamentary reinforcing elements, fire retardant thermosetting resin and the beads and placing the mass between skins such as the skins 11 and 17 and causing the matrix to cure to the thermoset form and bond to the surfaces of the skins such as the surfaces 14 and 21 of the skins 11 and 17. Alternatively, the expandable particles, thermosetting resin and filamentary reinforcing agents are prefoamed, cured to a desired form and subsequently adhered to the skins employing a fire retardant thermosetting resin. Beneficially, additional heat resistance is provided by adhering a metallic layer to one of the exposed surfaces of a panel in accordance with the invention. Such a metallic surface which may be beneficially employed to provide exceptional heat resistance is gold leaf which is readily adhered to the surface of fire retardant synthetic resins such as epoxy resins by first coating the surface of the gold leaf to be adhered with a solution of an epoxy Novolac resin in a volatile solvent, removing the solvent and subsequently curing the epoxy Novolac in contact with a thermosetting epoxy resin adhesive.

By way of further illustration, a panel is prepared employing glass cloth and fire retardant epoxy resin to form skins having a thickness of about 3/32 of an inch. Expanded polystyrene beads having diameters ranging from about 1/8 to 3/8 inch are admixed with a fire retardant epoxy or phenolic resin and chopped glass roving. The mixture of beads, roving and resin is compressed between the fire retardant epoxy glass skins and caused to harden to provide a panel having an overall thickness of about 3/4 inch. When cured, the resultant panel was exposed to a propane torch. After a period of about 29 minutes an opening had been burned and melted through the panel. The panel was removed and replaced with an aluminum sheet having a thickness of 0.032 inch and spaced an identical distance from the tip of the propane torch. An opening through the aluminum sheet appeared 19 seconds after exposure to the flame of the propane torch.

A wide variety of self-extinguishing thermoset resins may be employed and are described in U.S. Letters Patents 3,016,362; 3,058,946; 3,218,369 and 3,143,575. Expandable synthetic resinous particles suitable for the preparation of expanded particles in accordance with the present invention are disclosed in U.S. Letters Patent 2,744,291. Self-extinguishing beads are disclosed in U.S. Letters Patents 3,001,954; 3,058,926; 3,058,927; 3,058,928 and 3,058,929.

What is claimed is:

1. A laminate structure the laminate structure comprising
   a first high strength non-metallic skin,
   a second high strength non-metallic skin, the high strength non-metallic skins comprising fire retardant thermoset resins,
   a core, the core comprising
      a plurality of cellular synthetic resins particles adhered together by a thermoset fire retardant resin matrix,
      a plurality of high tensile strength filamentary inorganic reinforcing filaments contained partially within the resin matrix and portions of the filamentary reinforcing filaments adhered to each of the skins.

2. The structure of claim 1 wherein at least one high strength non-metallic skin comprises a resinous skin matrix and filamentary reinforcing material.

3. The structure of claim 2 wherein the resinous skin matrix is an epoxy resin.

4. The structure of claim 2 wherein the filamentary reinforcing material is glass filaments.

5. The structure of claim 4 wherein the reinforcing material is glass cloth.

6. The structure of claim 1 wherein the synthetic resin matrix is a phenolic resin.

7. The structure of claim 1 wherein the high tensile strength filamentary inorganic reinforcing filaments are glass filaments.

8. The structure of claim 1 wherein an adhesive of a fire retardant thermoset synthetic resin is disposed between the skins and the core and adheres the skins to the core.

9. The structure of claim 1 wherein the cellular synthetic resinous particles are expanded thermoplastic resinous particles.

10. The structure of claim 9 wherein the synthetic resinous particles are self-extinguishing.

11. The structure of claim 1 wherein at least a portion of one non-metallic skin has adhered thereto a metallic foil.

12. The structure of claim 11 wherein the metallic foil is a gold foil.

References Cited

UNITED STATES PATENTS

| | | | |
|---|---|---|---|
| 2,894,918 | 7/1959 | Killoran et al. | 260—2.5 |
| 2,928,456 | 3/1960 | Potchen et al. | 161—161 XR |
| 3,025,202 | 3/1962 | Morgan et al. | 161—159 XR |
| 3,158,529 | 11/1964 | Robitschek et al. | 161—161 |
| 3,194,708 | 7/1965 | Fourcade et al. | 117—98 XR |
| 3,223,576 | 12/1965 | Evans et al. | 161—159 XR |

ROBERT F. BURNETT, Primary Examiner

WILLIAM A. POWELL, Assistant Examiner

U.S. Cl. X.R.

156—60; 161—161, 162, 170, 403